US010295110B2

United States Patent
Bless

(10) Patent No.: US 10,295,110 B2
(45) Date of Patent: May 21, 2019

(54) ADAPTER FOR VACUUM-INSULATED LINES

(71) Applicant: Oerlikon Advanced Technologies AG, Balzers (LI)

(72) Inventor: Martin Bless, Oberschan (CH)

(73) Assignee: EVATEC AG, Trübbach (CH)

( * ) Notice: Subject to any disclaimer, the term of this patent is extended or adjusted under 35 U.S.C. 154(b) by 287 days.

(21) Appl. No.: 14/400,145

(22) PCT Filed: May 6, 2013

(86) PCT No.: PCT/CH2013/000076
§ 371 (c)(1),
(2) Date: Nov. 10, 2014

(87) PCT Pub. No.: WO2013/166612
PCT Pub. Date: Nov. 14, 2013

(65) Prior Publication Data
US 2015/0135730 A1    May 21, 2015

Related U.S. Application Data

(60) Provisional application No. 61/645,759, filed on May 11, 2012.

(51) Int. Cl.
| F16L 59/065 | (2006.01) |
| F16L 59/12  | (2006.01) |
| F16L 59/14  | (2006.01) |
| F16L 41/02  | (2006.01) |

(52) U.S. Cl.
CPC ............. *F16L 59/065* (2013.01); *F16L 41/02* (2013.01); *F16L 59/121* (2013.01); *F16L 59/141* (2013.01); *Y10T 137/698* (2015.04)

(58) Field of Classification Search
USPC ...................... 285/47, 124.1, 124.5
See application file for complete search history.

(56) References Cited

U.S. PATENT DOCUMENTS 5,150,926 A * 9/1992 Egli .................... F16L 39/00
   277/607
5,660,418 A   8/1997 Crawford

FOREIGN PATENT DOCUMENTS

DE       31 31 336 A1   2/1983
DE   20 2009 006902 U1  7/2009

OTHER PUBLICATIONS

International Search Report for PCT/CH2013/000076 dated Jul. 19, 2013.

* cited by examiner

*Primary Examiner* — Aaron M Dunwoody
(74) *Attorney, Agent, or Firm* — Pearne & Gordon LLP

(57) ABSTRACT

A vacuum adapter for feeding-through vacuum-insulated coolant lines (11, 12, 22, 23) from the surrounding atmosphere into a vacuum processing installation has an intermediate volume (2) which is connected firstly to at least one insulation intermediate space (32, 33) of the vacuum-insulated feed lines and secondly to a vacuum pump. The pump capacity is available at least temporarily for evacuating the insulation intermediate space around the coolant lines (22, 23).

6 Claims, 1 Drawing Sheet

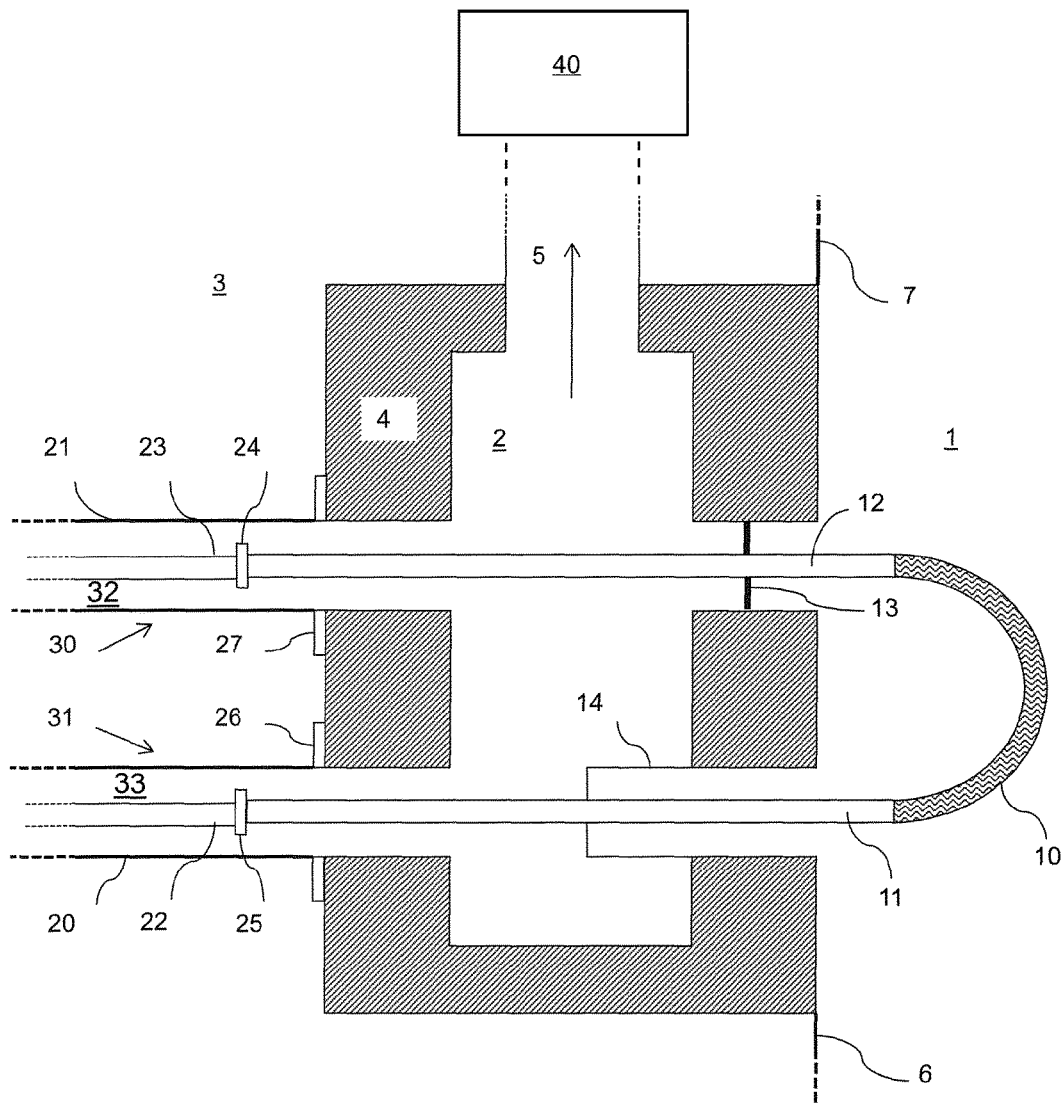

ADAPTER FOR VACUUM-INSULATED LINES

The invention described hereafter relates to an adapter respectively connector piece to connect a vacuum-insulated line to a vacuum processing facility.

TECHNICAL BACKGROUND

Vacuum processing facilities are systems in which workpieces or substrates are processed respectively treated in a processing room under vacuum conditions, in other words at ambient pressures below the atmospheric pressure. Such systems are known in the state of the art and are used for thermal treatments, coatings, etching processes and many other processes under reduced pressure conditions.

Many types of vacuum processing facilities use gates (load locks) in order to use a volume—smaller in comparison with the processing room—for inserting and removing the workpieces in the processing room. The advantage is that this smaller volume can be pumped out (evacuated) faster than the processing room, which thus can be maintained for longer below a low target pressure. Furthermore, in this manner, the processing room can more easily be kept free from harmful ambient gases such as water vapor, volatile organic compounds etc. Some of these contaminations can be removed only with difficulty by means of vacuum pumps, which is why the pumping output is often assisted by so-called Meissner traps. Broadly speaking, a Meissner trap constitutes a cooled condensation surface for trace gases respectively residual gases, primarily for water vapor under vacuum. They are generally made as conduits of copper or stainless steel that are placed in the vacuum chamber in the form of spirals or flat in a meandering pattern in order to provide a cooled surface that is as large as possible. Most commonly, commercially available non-CFC coolants or liquid gases (e.g. $N_2$) can be contemplated as cooling liquids.

The cooling liquid must be directed from a source (e.g. cooling unit, storage tank) into and again out of the vacuum processing chamber by means of insulated lines. For this, vacuum-insulated lines are commonly used in which a flexible line or conduit in an external, vacuum-sealed protective sleeve is guided. The intermediate space between the coolant line itself and the external sleeve is evacuated so that the heat loss to the environment is minimized. Such vacuum lines are commercially available, they can be bought ready to use (pre-evacuated). The intermediate space is often provided with getter material that can compensate for possible leakages or residual gases. The lines are connected via vacuum feed-through in the processing chamber wall with the Meissner trap which, depending on the type of use, can be in the processing room or in a gate/lock.

DISADVANTAGES OF THE STATE OF THE ART

The vacuum lines described are sensitive and no reliably vacuum-tight for a long time. Dismantling and replacing respectively post-evacuating involves a considerable maintenance requirement that negatively impacts the operating efficiency of vacuum processing facilities especially for industrial use.

BRIEF DESCRIPTION OF THE DRAWING

The FIGURE shows a cross section of a vacuum adapter according to the invention.

SUMMARY OF THE INVENTION

The present invention should overcome the disadvantages of the state of the art. To this effect, a vacuum adapter is proposed that is adapted for feeding-through coolant lines in a vacuum processing installation. These lines are discharged to atmosphere in vacuum-insulated feed lines 30, 31. An adapter 4 has an intermediate volume 2 that is connected on the one hand with at least one insulation intermediate space 32, 33 of the vacuum-insulated feed lines 30, 31 and on the other hand with a vacuum pump 40.

DETAILED DESCRIPTION

The solution according to the present invention consists in a vacuum adapter for connecting a coolant line to a cooling trap of a vacuum processing system and simultaneously allows access to the vacuum insulation of the lines. Via this access, a backing pump that is anyway present in the processing system can be connected operatively with the vacuum insulation so that the pump capacity can be used, e.g. with the aid of valves, for evacuating the insulation intermediate space of the feed lines. This can preferably occur when the system itself temporarily does not need this pump capacity. This can happen in a demand-driven fashion or periodically or permanently for preventative maintenance, preferably under the control e.g. of a routine of the vacuum processing facility control itself.

In the FIGURE, the vacuum adapter 4 is shown in cross section. It can be mounted on the wall of a processing facility or even integrated therein. The FIGURE shows a vacuum room 1 and hints at the walls of the facility by means of references 6, 7. An outlined cooling trap 10 is fed by a feed respectively drain line 11, 12. The vacuum adapter 4 comprises a volume 2 that is connected through a pump neck 5 with a vacuum pump 40. The volume 2 is sealed vis-à-vis the vacuum room 1 by means of sealing devices 13, 14 that allow a passage for the coolant feed lines 12, 11. Ideally, the sealing devices 13, 14 also provide a thermal insulation of the line 11, 12 vis-à-vis the adapter 4 respectively the wall connectors 6, 7. Reference 13 designates a simple disc that can consist of poorly heat-conducting material. Detail 14 denotes a bushing that is screwed e.g. in the wall of the adapter 4 and by means of the projection into the volume 2 increases the heat conductivity resistance between the bracket of the line 11 and the wall. The evacuable volume 2 is open to the insulation intermediate space 32 respectively 33 of the vacuum feed lines 30, 31, and thus enables the latter to evacuate without mechanically separating the connections or affecting the vacuum in room 1. The vacuum lines 30, 31 consist of an outer sleeve 20, 21 that can be executed as a rigid or flexible conduit, corrugated tube, envelope or hose. An inner line 22, 23, represents the coolant line to or from the adapter 4. References 26 and 27 are flange connections of the external cladding tube 20, 21 to the adapter 4; the connection can alternatively also be made by screwing, welding or by means of another suitable type of connection. The same applies for the outlined flange 24, 25 of the inner line 22, 23. The insulation intermediate space 32, 33 respectively its dimensional stability can be ensured by means of the spacing elements (not shown here).

As illustrated in the drawing, the insulation intermediate space 32, 33 is connected permanently with a pump option via the inner space 2 of the adapter 4. This ensures the operative performance of the vacuum insulation of the feed lines 30, 31, and if necessary even controls it fully automatically. Furthermore, a pressure sensor can be installed in the intermediate volume 2 that displays a drop in the insulation vacuum and provides a warning message before the refrigerating capacity in the vacuum room 1 drops. If a processing step may be stopped or delayed in this way, it is possible to avoid damages respectively faults in the workpieces in the room 1.

What is claimed is:

1. Vacuum processing installation with a vacuum room (1) and a vacuum adapter (4), wherein the vacuum adapter (4) is connected to a vacuum room (1), to coolant lines (11, 12, 22, 23) in vacuum-insulated feed lines (30, 31) and a vacuum pump, the vacuum adapter (4) comprising:

an enclosure defining an intermediate volume (2), the intermediate volume (2) being configured to fluidly connect to an insulation intermediate space (32, 33) of the vacuum-insulated feed lines (30, 31), sealing devices (13, 14) disposed in openings in the enclosure, the sealing devices (13, 14) being adapted to fluidly isolate the intermediate volume (2) from the vacuum room (1), wherein the sealing devices (13, 14) are configured to allow the coolant lines (11, 12) to extend through the sealing devices (13, 14), and a pump neck (5) formed in the enclosure and configured to fluidly communicate with the intermediate volume (2), the pump neck being adapted to be connected with the vacuum pump (40), wherein the sealing devices (13, 14) are configured to provide a thermal barrier between the coolant lines (11, 12) and the enclosure by preventing a direct contact between the coolant lines (11, 12) and the enclosure, and at least one of the sealing devices is a bushing (14) attached to the enclosure and having a projection portion extending into the intermediate volume (2) to define an area around the coolant lines (11, 12) that extends into the intermediate volume (2), the area configured to hinder heat conduction between the coolant lines (11, 12) and the enclosure.

2. Vacuum processing installation according to claim 1, characterized in that the enclosure has a pressure sensor in the intermediate volume (2) that is capable of displaying a drop in the insulation vacuum.

3. Vacuum processing installation according to claim 1, wherein the vacuum-insulated feed lines (30, 31) consist of an outer sleeve (20, 21) in the form of a rigid or flexible conduit, a corrugated tube, an envelope or hose, and have an inner line as coolant line (22, 23).

4. Vacuum processing installation according to claim 1, wherein the vacuum adapter (4) is mounted on a wall of the vacuum processing installation by means of wall connectors (6, 7) or is integrated in the wall of the vacuum processing installation.

5. Vacuum processing installation according to claim 1, wherein the vacuum pump is a backing pump.

6. Vacuum processing installation with a vacuum room (1), coolant lines (11, 12, 22, 23) and a vacuum adapter (4), wherein the vacuum adapter (4) is connected to the vacuum room (1), to the coolant lines (11, 12, 22, 23) in vacuum-insulated feed lines (30, 31) and to a vacuum pump, the vacuum adapter (4) comprising:

an enclosure defining an intermediate volume (2), the intermediate volume (2) being configured to fluidly connect to an insulation intermediate space (32, 33) of the vacuum-insulated feed lines (30, 31), sealing devices (13, 14) disposed in the enclosure, the sealing devices (13, 14) being adapted to fluidly isolate the intermediate volume (2) from the vacuum room (1), wherein the sealing devices (13, 14) are configured to allow the coolant lines (11, 12) to extend through the sealing devices (13, 14), and a pump neck (5) formed in the enclosure and configured to fluidly communicate with the intermediate volume (2), the pump neck being adapted to be connected with the vacuum pump (40), wherein the sealing devices (13, 14) are configured to provide a thermal barrier between the coolant lines (11, 12) and the enclosure by preventing a direct contact between the coolant lines (11, 12) and the enclosure, and at least one of the sealing devices is a bushing (14) attached to the enclosure and having a projection portion extending into the intermediate volume (2) to define an area around the coolant lines (11, 12) that extends into the intermediate volume (2), the area configured to hinder heat conduction between the coolant lines (11, 12) and the enclosure.

* * * * *